(12) United States Patent
Gilboy et al.

(10) Patent No.: US 7,613,283 B1
(45) Date of Patent: Nov. 3, 2009

(54) METHOD AND APPARATUS FOR INTERACTIVE VOICEMAIL

(75) Inventors: Christopher Gilboy, Freehold, NJ (US); James Ehlinger, Colts Neck, NJ (US); Marius Gudelis, Holmdel, NJ (US)

(73) Assignee: AT&T Intellectual Property II, LP, Reno, NV (US)

( * ) Notice: Subject to any disclaimer, the term of this patent is extended or adjusted under 35 U.S.C. 154(b) by 779 days.

(21) Appl. No.: 11/065,686

(22) Filed: Feb. 24, 2005

(51) Int. Cl.
*H04M 1/64* (2006.01)

(52) U.S. Cl. .......... 379/88.18; 379/69; 379/88.04; 379/88.13; 379/114.2; 379/265.13; 455/413; 455/563; 705/10; 705/75; 709/206; 715/727

(58) Field of Classification Search .......... 379/88.04, 379/88.08, 88.18, 106.02, 201.01, 69, 88.17, 379/114.2, 221.08, 265.02, 265.16, 266.07; 455/413, 563; 705/1, 10, 14, 75; 709/206
See application file for complete search history.

(56) References Cited

U.S. PATENT DOCUMENTS

| | | | | |
|---|---|---|---|---|
| 5,588,042 A * | 12/1996 | Comer | ...................... | 455/413 |
| 5,943,416 A * | 8/1999 | Gisby | ..................... | 379/265.13 |
| 6,044,134 A * | 3/2000 | De La Huerga | .......... | 379/88.08 |
| 6,216,111 B1 * | 4/2001 | Walker et al. | .................. | 705/14 |
| 6,226,360 B1 * | 5/2001 | Goldberg et al. | ............... | 379/69 |
| 6,330,550 B1 * | 12/2001 | Brisebois et al. | .............. | 705/75 |
| 6,366,658 B1 * | 4/2002 | Bjornberg et al. | ...... | 379/221.08 |
| 6,393,107 B1 * | 5/2002 | Ball et al. | ................. | 379/88.13 |
| 6,459,774 B1 * | 10/2002 | Ball et al. | .................. | 379/67.1 |
| 6,725,063 B2 * | 4/2004 | Choi | .......................... | 455/563 |
| 6,728,353 B1 * | 4/2004 | Espejo et al. | ............ | 379/114.2 |
| 6,785,363 B2 | 8/2004 | Culliss | | |
| 6,870,913 B2 * | 3/2005 | Narasimhan et al. | ... | 379/106.02 |
| 7,079,629 B1 * | 7/2006 | Fellingham et al. | ...... | 379/88.16 |
| 7,187,761 B2 * | 3/2007 | Bookstaff | .............. | 379/201.01 |
| 7,197,461 B1 * | 3/2007 | Eberle et al. | ................. | 704/275 |
| 7,280,651 B2 * | 10/2007 | Anderson | .............. | 379/266.07 |
| 7,321,920 B2 * | 1/2008 | Washburn | .................... | 709/206 |
| 7,382,867 B2 * | 6/2008 | Smith et al. | .............. | 379/88.04 |
| 2002/0054072 A1 * | 5/2002 | Hayes-Roth | ................ | 345/727 |
| 2002/0120491 A1 * | 8/2002 | Nelson | ........................ | 705/10 |
| 2003/0008638 A1 * | 1/2003 | Worley et al. | ............... | 455/413 |
| 2004/0030594 A1 * | 2/2004 | Berczik | ....................... | 705/14 |
| 2004/0133434 A1 * | 7/2004 | Szlam et al. | ................... | 705/1 |
| 2005/0147228 A1 * | 7/2005 | Perrella et al. | ......... | 379/265.06 |
| 2006/0002540 A1 * | 1/2006 | Kreiner et al. | ......... | 379/265.02 |
| 2006/0018446 A1 * | 1/2006 | Schmandt et al. | ........ | 379/88.17 |

* cited by examiner

*Primary Examiner*—Gerald Gauthier

(57) ABSTRACT

A system and method for delivering interactive voice messages using a voice messaging system are disclosed. In an illustrative embodiment, the system comprises a voice messaging processor and memory containing machine readable instructions which, when executed by the processor, enable the voice messaging system to: receive an inbound call from a sender; record an interactive voice message from the sender directed to at least one recipient; receive a voice message retrieval request from a recipient; play the interactive voice message for the recipient; and initiate an interactive session with the recipient to elicit responses from the recipient regarding the interactive voice message. In one aspect of the invention, an application server is provided for generating interactive voicemails and placing the inbound call from the sender to the voice messaging processor.

22 Claims, 5 Drawing Sheets

METHOD AND APPARATUS FOR INTERACTIVE VOICEMAIL

BACKGROUND OF THE INVENTION

The present invention relates generally to voice messaging, and more particularly, to an interactive voicemail system and methodology that enables a caller to leave an interactive voicemail for a called party on the called party's voice mailbox.

Voice messaging systems for sending and receiving messages between users that are subscribers of the system are well known in the art. A "subscriber" is a person that has actively subscribed to the voice messaging system by creating either (1) a voice mailbox and/or (2) a billing relationship with the provider where the Subscriber agrees to pay money, either directly or indirectly through the purchase of other services, for use of the voice messaging system.

A voice mailbox is a storage area within the voice messaging system that is addressable by a number. The number selected to address the voice mailbox may be any number, such a number coinciding with the subscriber's telephone number. The voice mailboxes of typical prior art voice messaging systems require that the subscriber both (1) periodically call into the system to determine if there are any messages in the mailbox, and (2) call into the system to listen to messages. Most people, however, already have separate voicemail systems or answering machines that answer the telephone and record messages from live callers. As such, these prior art voice messaging systems create yet another mailbox that both senders and/or receivers must check in addition to their existing answering machine or separate voicemail system.

Examples of a subscriber billing relationship include, but are not limited to, a monthly subscription fee, the purchase of related or unrelated services such as local telephone calling or long distance calling, or the outright purchase of a voice messaging system (hardware or software) through either an installment sale or single payment. It is through these and other types of billing relationships, or by creating a mailbox as described above, that people actively subscribe to become subscribers to prior art messaging systems.

After actively subscribing to the voice messaging service and/or creating a separate mailbox, a subscriber can send and receive messages with other subscribers by calling into the system, logging into the particular mailbox and then creating and sending messages to mailboxes of other subscribers within the same voice messaging system.

In an exemplary application, a subscriber who has previously subscribed to the voice messaging service, places a telephone call into the voice messaging system. The subscriber then signs into his or her voice mailbox, records a message for an intended recipient, and enters a telephone number of the intended recipient. The voice messaging service then determines whether the recipient is a subscriber to the voice messaging service. If the recipient is a subscriber, then the voice messaging system deposits the voice message in the recipient's voice mailbox. The recipient can then access the voice message by calling into the voice messaging system in a conventional manner. If the recipient is not a subscriber, the voice messaging service may call the recipient and simply play the recorded message.

U.S. Pat. No. 6,785,363 discloses a voice messaging system that enables non-subscribers of a voice messaging service to send, receive and reply to voicemails. In this regard, a system and methodology are provided for a sender to deliver voice messages to a receiver, where neither the sender nor receiver are subscribers to a voicemail service associated with the system. Voice messages can be delivered to non-subscribers and, if they are not home or reachable on a mobile phone, recorded into an existing answering machine or voicemail system of the recipient.

Telemarketers have been facing increasing challenges in reaching prospective customers. Consumers frustrated by such calls have resorted to caller ID and answer machine screening. Furthermore, "do-not-call" lists have become mandated and will continue to reduce a telemarketer's customer base. Since many telecommunications companies rely upon revenue from telemarketers, there exists a need for a system and methodology by which telemarketers can reach their intended customers. The present invention addresses this need by providing a system and methodology that enables telemarketers to reach prospective customers through a voice messaging system, and in particular, where the customers can choose to interact with the voicemail in response to interactive prompting.

SUMMARY OF INVENTION

In accordance with an aspect of the present invention, a system and method are provided for delivering interactive voice messages using a voice messaging system. In an illustrative embodiment, the system comprises a voice messaging processor and memory containing machine readable instructions which, when executed by the processor, enable the voice messaging system to: receive an inbound call from a sender; record an interactive voice message from the sender directed to at least one recipient; receive a voice message retrieval request from a recipient; play the interactive voice message for the recipient; and initiate an interactive session with the recipient to elicit responses from the recipient regarding the interactive voice message. In one aspect of the invention, an application server is provided for generating interactive voicemails and placing the inbound call from the sender to the voice messaging processor. The application server is associated with a telemarketer who desires to leave interactive voicemails for recipients.

In accordance with another aspect of the invention, a method is provided for delivering interactive voice messages using a voice messaging system. The method comprises the steps of: receiving an inbound call from a sender; recording an interactive voice message from the sender directed to at least one recipient; receiving a voice message retrieval request from a recipient; playing the interactive voice message for the recipient; and initiating an interactive session with the recipient to elicit responses from the recipient regarding the interactive voice message. The interactive voice message may provide the recipient with an opportunity to request information, an opportunity to decline information, an opportunity to respond to a questionnaire, an opportunity to respond to a survey, an opportunity to respond to the advertisement, or the like.

In accordance with another aspect of the invention, the voice messaging system can initiate calls to recipients who are not subscribers to the voicemail system to play interactive voicemails to those recipients. In this regard, the method comprises the steps of: receiving an inbound call from a sender; recording an interactive voice message from the sender directed to at least one recipient; placing an outbound call to the at least one recipient; playing the interactive voice message for the recipient; and initiating an interactive session with the recipient to elicit responses from the recipient regarding the interactive voice message.

DETAILED DESCRIPTION OF THE PREFERRED EMBODIMENTS

Figure 1:
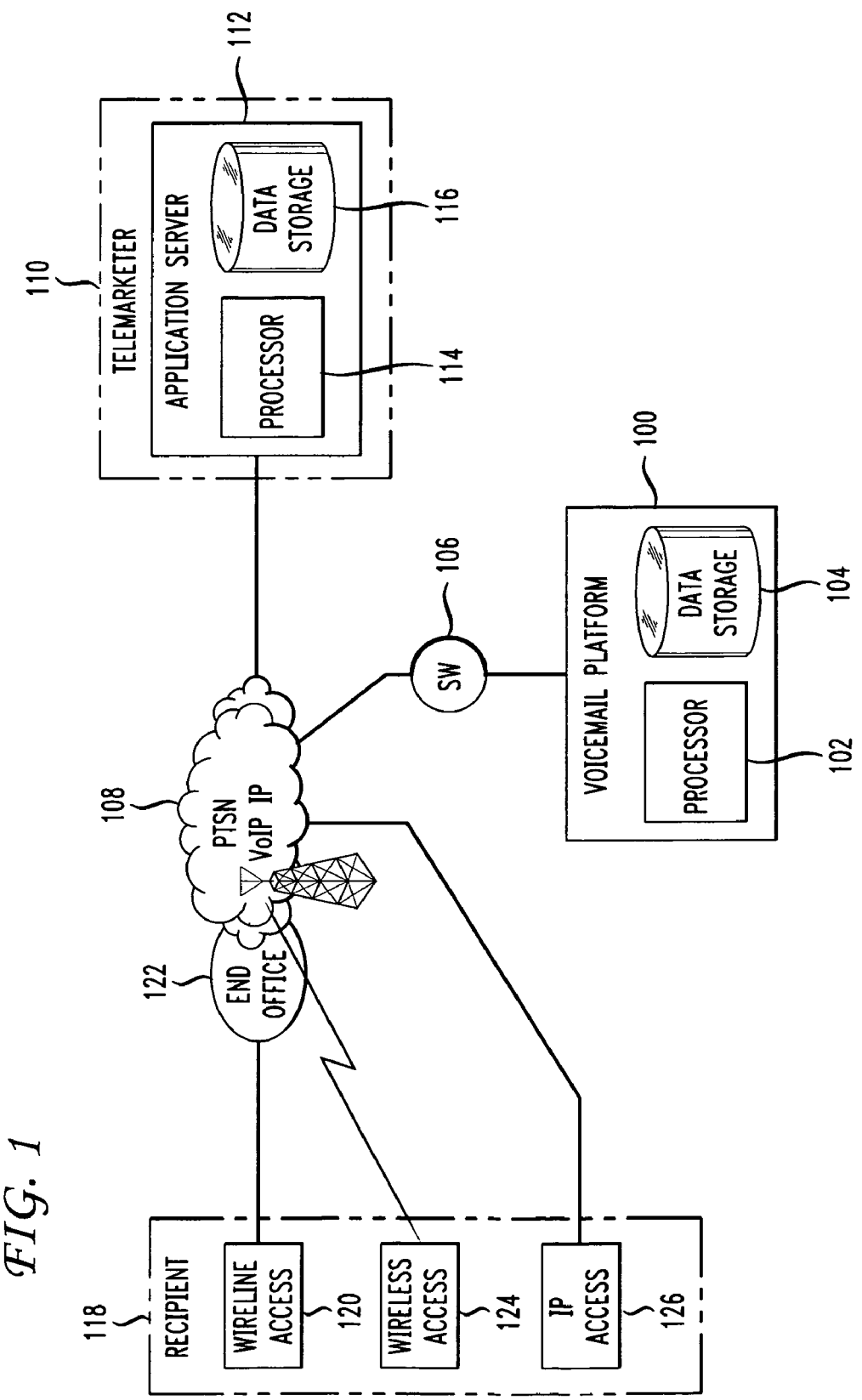
FIG. 1 is a schematic diagram of a voice messaging system in accordance with an aspect of the present invention.

FIG. 1 is a schematic depicting an interactive voicemail system which generally comprises a voicemail platform 100 which includes a processor 102 and data storage 104 including memory containing machine readable instructions which are executed by the processor 102. The voicemail platform 100 communicates through a switch 106 with a PTSN, VoIP or IP cloud 108 of the type well known in the art. Voicemails originate from a telemarketer generally characterized by the reference numeral 110. The telemarketer has access to or otherwise includes an application server 112 which comprises a processor 114 and data storage 116. The functions of these elements will be explained in more detail below. The application server 112 communicates with cloud 108 through an appropriate interface. The application server 112 initiates calls to the voicemail platform as will also be described in further detail below. For the purpose of description, the application server 112 is referred to as the "sender" herein. A targeted caller or "recipient" 118 can access the voicemail platform 100 through standard wireline access 120 via an end office 122, wireless access 124 or Internet Protocol (IP) access 126, all of which are coupled to cloud 108 in a conventional manner. For ease of description, the following discussion will refer to communications between the recipient 118 and the voicemail platform 100 as standard telephone calls. However, it is to be understood that telephone is meant to be any wireless or wireline device that communicates with cloud 108 through audio and/or video means.

Figure 2:
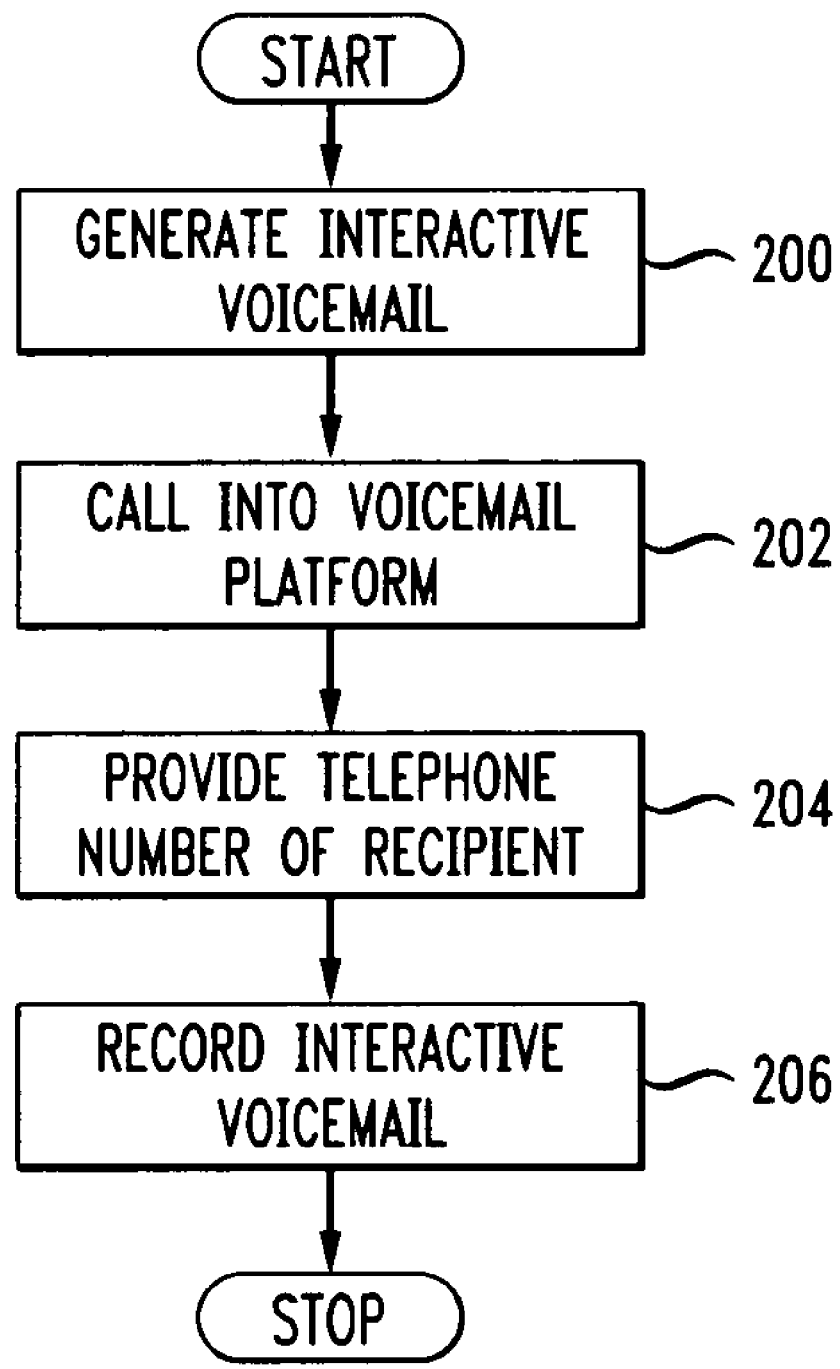
FIG. 2 is a flowchart of a process whereby a telemarketer leaves an interactive voicemail for a recipient.

Referring now to FIG. 2, there is depicted an exemplary flowchart of a process whereby a telemarketer 110 leaves an interactive voicemail for a recipient 118. At step 200, the application server generates an interactive voicemail for a recipient 118 or a group of recipients (not shown). For the purpose of illustration, only a single recipient 118 is shown and described. The interactive voicemail may be retrieved from data storage 116 if it were previously created, or generated by the processor 114 through an appropriate computer interface to an operator. By "interactive," it is meant anything that will require a prospective recipient to reply in some way to the voicemail. For example, the interactive voicemail might comprise a questionnaire for the recipient to respond to, a series of options for the recipient to request more information in response to the voicemail, an opportunity to decline additional information, or the like. At step 202, the application server (sender) 112 calls into the voicemail platform 100, such as, for example, dialing a telephone to place an inbound call into the voicemail platform 100. The voicemail platform 100 receives the call and the application server 112 will be prompted to enter the telephone number of the recipient at step 204. The voicemail platform 100 will then allow the sender 112 to record an interactive voicemail in the data storage 104 of the voicemail platform 100 at step 206. It is assumed that the sender has a subscription agreement with the voicemail platform 100 that enables it to deposit such voicemail messages as described in the foregoing.

Figure 3:
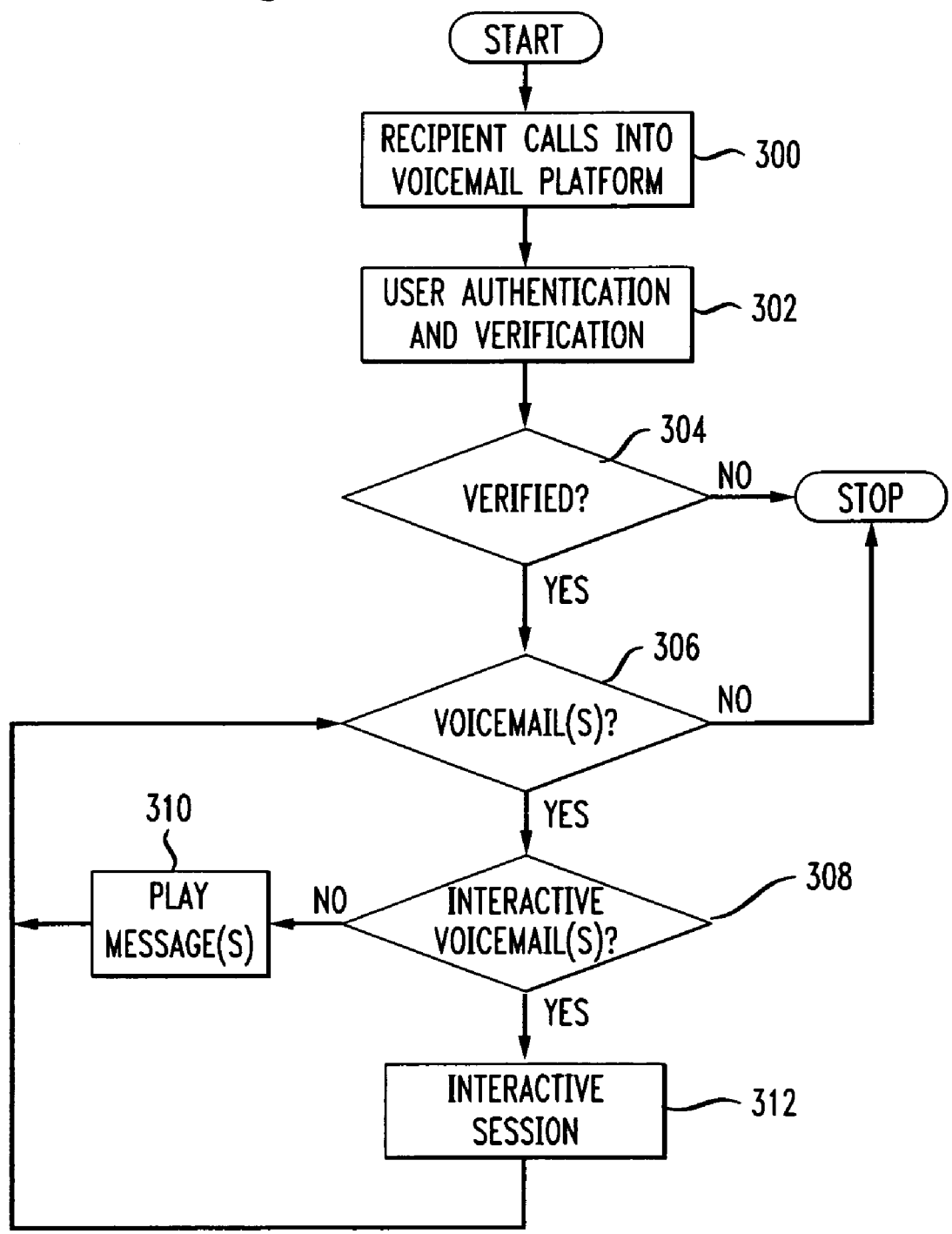
FIG. 3 is a flowchart of a process whereby a recipient obtains and responds to an interactive voicemail.

Referring now to FIG. 3, there is depicted an exemplary flowchart of a first process whereby a recipient receives an interactive voicemail from the voicemail platform 100. In step 300, the recipient calls into the voicemail platform 100 to check his or her voice messages. Here, it is assumed that the recipient is a subscriber to a voicemail system encompassing the voicemail platform 100. At step 302, the voicemail platform 100 performs user authentication and verification to determine if the recipient is a subscriber to the voicemail system. If the recipient is verified at step 304, control then jumps to step 306 where the voice platform 100 determines whether there are voicemails in the voice mailbox of the recipient. If there are voicemails in the recipient's mailbox, the voicemail platform checks at step 308 whether there are any interactive voicemails in the voice mailbox of the recipient. If there are no interactive voice messages but there are regular voice messages in the recipient's voice mailbox, control then goes to step 310 where the regular voicemails are played in a conventional manner. If there are interactive voice messages in the recipient's mailbox, then control goes to step 312 and an interactive voicemail session is initiated, an example of which is described in more detail below.

Figure 4:
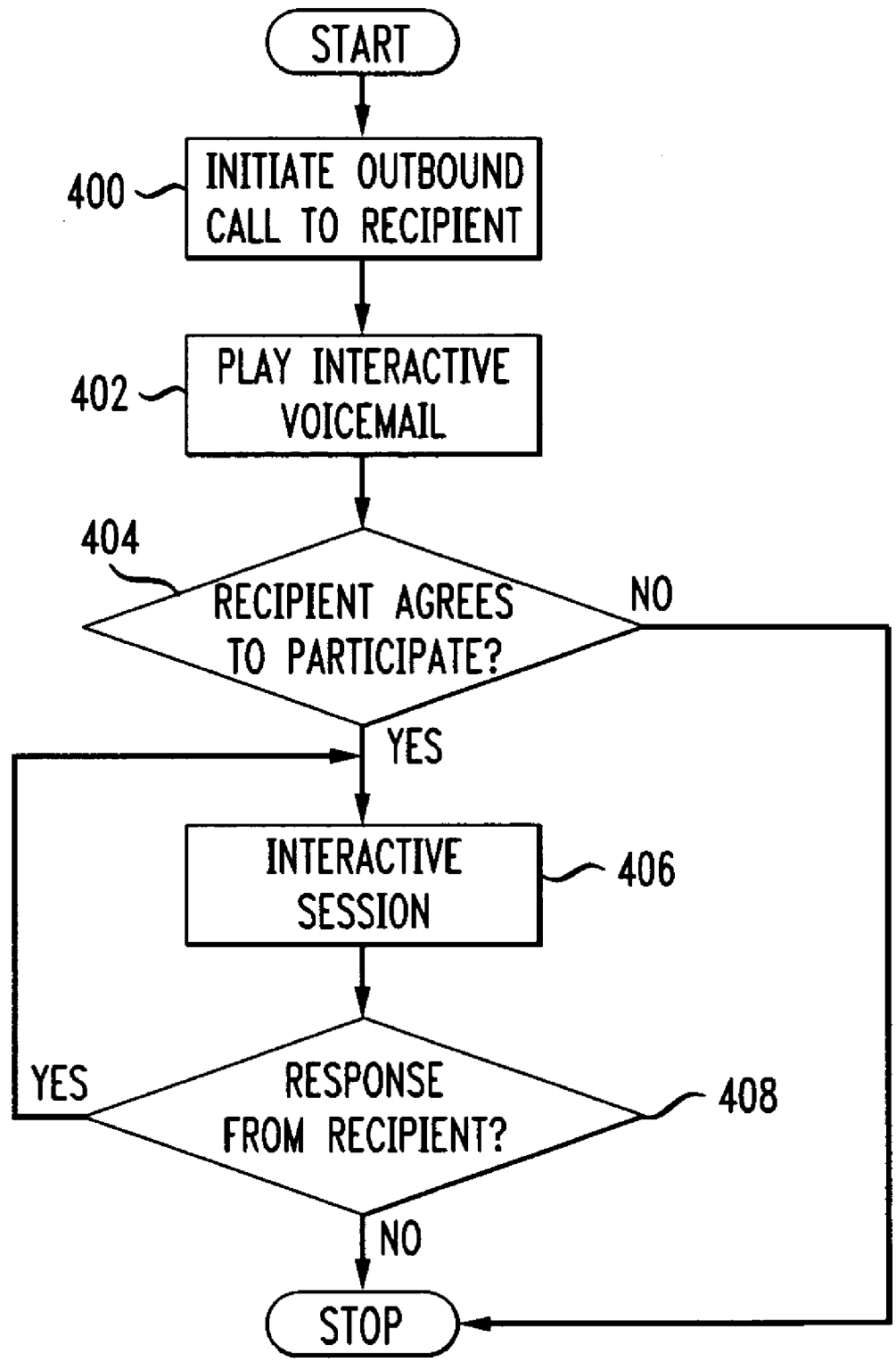
FIG. 4 is a flowchart of a process whereby the voice messaging system initiates a call to a recipient of an interactive voicemail.

Referring now to FIG. 4, there is depicted an alternative embodiment of the process depicted in FIG. 3, where a non-subscriber to the voicemail platform 100 is contacted by the voicemail platform 100. In step 400, the voicemail platform 100 initiates an outbound call to the recipient 118. The recipient's phone number was previously specified by the application server 112 when it deposited an interactive voicemail message in the voicemail platform 100. At step 402, the voicemail platform 100 plays the interactive voicemail to the recipient. If the recipient agrees to participate at step 404, the voicemail platform starts an interactive session at step 406. This process continues until the voicemail platform determines that there are no outstanding responses to be elicited from the recipient at step 408. Although this is similar to receiving a direct call from a telemarketer, the presence of an interactive voicemail message in lieu of a live caller may make it more likely that an intended recipient will be receptive to listen to the telemarketer's pitch.

In order to provide the interactive voicemail function, there are two exemplary applications. In the first, the voicemail platform 100 connects to the application server 112 and the application server maintains a session with the voicemail platform to provide the interactive functionality. In this connection, the voicemail platform may send a setup message to the application server in order to set up a media and command stream of the type well known in the art. It will be appreciated by those skilled in the art that common voice over IP (VoIP) protocols can be utilized. When the application server 112 releases the call, the voicemail platform 100 would continue the process independently. In another expedient, the interactive voicemail itself consists of messages and prompts encoded in a syntax that is understood by the voicemail platform 100. An exemplary pseudo-code may take the following form:

PLAY_MESSAGE ("Welcome. Would you like to take a survey?");
COLLECT_SPEECH (response);

```
IF(response="yes") THEN ADMINISTER_SURVEY( );
ELSE PLAY_MESSAGE ("Good bye");
ENDIF EXIT( )
```

It is anticipated that many different forms could be utilized within the scope of the invention.

Figure 5:
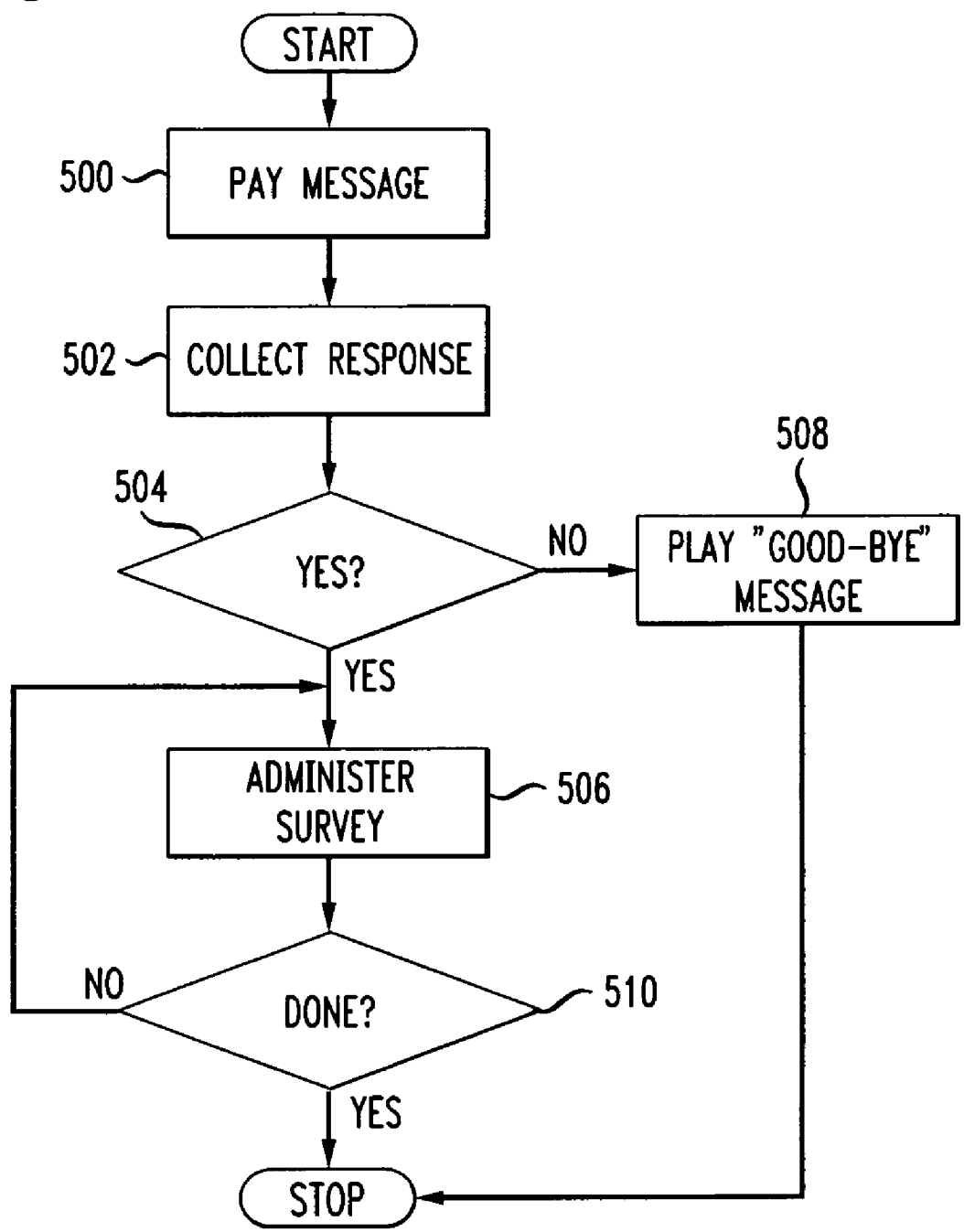
FIG. 5 is a flowchart of an exemplary interactive session.

FIG. 5 is an exemplary flowchart of an interactive session in accordance with an aspect of the present invention where a recipient is presented with an interactive voicemail that provides the opportunity to take a survey. At step 500, the voicemail platform 100 plays an interactive voicemail message to the recipient, such as, for example, "Welcome. Would you like to take a survey?" At step 502, the voicemail platform 100 receives a response from the recipient as to whether the recipient wishes to participate or decline. If the answer is in the affirmative at step 504, the voicemail platform 100 will administer the survey in an interactive session at step 506. If the recipient declines to take part in the survey, the voicemail platform 100 plays a "goodbye" message at step 508. The voicemail platform maintains an interactive session with the recipient until the recipient has indicated that he or she has completed the survey at step 510.

The exemplary survey application is intended to be merely illustrative of many types of interactive sessions that can be established in accordance with the invention. For example, the interactive session could be a questionnaire of any type, or could include a plurality of advertisements for the recipient. An insurance company could leave a voicemail with a prompt for a recipient to hit "1" for more information. An information provider could provide advertisements to a recipient on a periodic basis, track the number of messages that the recipient listens to, and then compensate that recipient for the time spent listening to the advertisements. This methodology is an improvement over standard telemarketing as such voicemails can be deposited into a recipient's voice mailbox without ever ringing the recipient's telephone. It is further anticipated that a message waiting indicator can be set to either notify the recipient of these special messages, or to provide notification of non-interactive messages only.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations which, although not explicitly shown or described herein, embody the principles of the invention and are within their spirit and scope.

We claim:

1. A method for enabling telemarketers to deliver interactive voice messages using a voice messaging system, comprising the steps of:
    receiving an inbound call from a telemarketer's application server;
    recording an interactive voice message from the application server directed to at least one recipient targeted by the telemarketer;
    receiving a voice message retrieval request from a recipient targeted by the telemarketer;
    playing the interactive voice message for the recipient; and
    initiating an interactive session with the recipient to elicit responses from the recipient regarding the interactive voice message.

2. The method recited in claim 1, wherein the interactive voice message provides the recipient with an opportunity to request information.

3. The method recited in claim 1, wherein the interactive voice message provides the recipient with an opportunity to decline information.

4. The method recited in claim 1, wherein the interactive voice message provides the recipient with an opportunity to respond to a questionnaire.

5. The method recited in claim 1, wherein the interactive voice message provides the recipient with an opportunity to respond to a survey.

6. The method recited in claim 1, wherein the interactive voice message is an advertisement that provides the recipient with an opportunity to respond to the advertisement.

7. A method for enabling telemarketers to deliver interactive voice messages using a voice messaging system comprising the steps of:
    receiving an inbound call from a telemarketer's application server;
    recording an interactive voice message from the application server directed to at least one recipient targeted by the telemarketer;
    receiving a voice message retrieval request from a recipient targeted by the telemarketer;
    playing the interactive voice message for the recipient; and
    initiating an interactive session with the recipient to elicit responses from the recipient regarding the interactive voice message,
    wherein a voicemail platform creates a connection to the application server and a media stream and command stream are set up between the voicemail server and the application server.

8. The method recited in claim 7, wherein the interactive voicemail comprises messages and prompts encoded in a syntax recognized by the voicemail platform.

9. A method for enabling telemarketers to deliver interactive voice messages using a voice messaging system, comprising the steps of:
    receiving an inbound call from a telemarketer's application server;
    recording an interactive voice message from the application server directed to at least one recipient targeted by the telemarketer;
    placing an outbound call to the at least one recipient targeted by the telemarketer;
    playing the interactive voice message for the recipient; and
    initiating an interactive session with the recipient to elicit responses from the recipient regarding the interactive voice message.

10. The method recited in claim 9, wherein the interactive voice message provides the recipient with an opportunity to request information.

11. The method recited in claim 9, wherein the interactive voice message provides the recipient with an opportunity to decline information.

12. The method recited in claim 9, wherein the interactive voice message provides the recipient with an opportunity to respond to a questionnaire.

13. The method recited in claim 9, wherein the interactive voice message provides the recipient with an opportunity to respond to a survey.

14. The method recited in claim 9, wherein the interactive voice message is an advertisement that provides the recipient with an opportunity to respond to the advertisement.

15. The method recited in claim 9, wherein the interactive voicemail comprises messages and prompts encoded in a syntax recognized by the voicemail platform.

16. A method for enabling telemarketers to deliver interactive voice messages using a voice messaging system, comprising the steps of:
- receiving an inbound call from a telemarketer's application server;
- recording an interactive voice message from the application server directed to at least one recipient targeted by the telemarketer;
- placing an outbound call to the at least one recipient targeted by the telemarketer;
- playing the interactive voice message for the recipient; and
- initiating an interactive session with the recipient to elicit responses from the recipient regarding the interactive voice message,
- wherein a voicemail platform creates a connection to the application server and a media stream and command stream are set up between the voicemail server and the application server.

17. A voice messaging system for enabling telemarketers to deliver interactive voice messages, the voice messaging system comprising a voice messaging processor and memory containing machine readable instructions which, when executed by the processor, enable the voice messaging system to:
- receive an inbound call from a telemarketer's application server;
- record an interactive voice message from the application server directed to at least one recipient targeted by the telemarketer;
- receive a voice message retrieval request from a recipient targeted by the telemarketer;
- play the interactive voice message for the recipient; and
- initiate an interactive session with the recipient to elicit responses from the recipient regarding the interactive voice message.

18. The voice messaging system recited in claim 17, wherein the interactive voice message provides the recipient with an opportunity to request information.

19. The method recited in claim 17, wherein the interactive voice message provides the recipient with an opportunity to decline information.

20. The method recited in claim 17, wherein the interactive voice message provides the recipient with an opportunity to respond to a questionnaire.

21. The method recited in claim 17, wherein the interactive voice message provides the recipient with an opportunity to respond to a survey.

22. The method recited in claim 17, wherein the interactive voice message is an advertisement that provides the recipient with an opportunity to respond to the advertisement.

* * * * *